US009256551B2

(12) United States Patent
Paaske et al.

(10) Patent No.: US 9,256,551 B2
(45) Date of Patent: Feb. 9, 2016

(54) EMBEDDED ENCRYPTION/SECURE MEMORY MANAGEMENT UNIT FOR PERIPHERAL INTERFACE CONTROLLER

(71) Applicant: Apple Inc., Cupertino, CA (US)

(72) Inventors: Timothy R. Paaske, Cupertino, CA (US); David S. Warren, Campbell, CA (US); Michael J. Smith, San Francisco, CA (US); Diarmuid P. Ross, Mountain View, CA (US); Weihua Mao, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 13/963,457

(22) Filed: Aug. 9, 2013

(65) Prior Publication Data

US 2015/0046702 A1    Feb. 12, 2015

(51) Int. Cl.
| | |
|---|---|
| *H04L 29/06* | (2006.01) |
| *G06F 12/14* | (2006.01) |
| *H04L 9/12* | (2006.01) |
| *G06F 21/60* | (2013.01) |
| *G06F 21/72* | (2013.01) |
| *G06F 21/85* | (2013.01) |
| *G06F 21/87* | (2013.01) |
| *G09C 1/00* | (2006.01) |

(52) U.S. Cl.
CPC .......... *G06F 12/1408* (2013.01); *G06F 21/602* (2013.01); *G06F 21/72* (2013.01); *G06F 21/85* (2013.01); *G06F 21/87* (2013.01); *G09C 1/00* (2013.01); *H04L 9/12* (2013.01); *H04L 2209/12* (2013.01)

(58) Field of Classification Search
CPC ... G06F 12/14; G06F 12/1408; G06F 13/102; G06F 13/20; G06F 12/1081
See application file for complete search history.

(56) References Cited

U.S. PATENT DOCUMENTS

| | | | |
|---|---|---|---|
| 5,014,194 A | * | 5/1991 | Itoh .................................. 710/3 |
| 8,468,417 B2 | | 6/2013 | Asnaashari et al. |
| 2006/0095793 A1 | | 5/2006 | Hall |
| 2008/0107275 A1 | | 5/2008 | Asnaashari |

(Continued)

FOREIGN PATENT DOCUMENTS

| | | |
|---|---|---|
| EP | 2565795 | 3/2013 |
| WO | 2005036406 | 4/2005 |

OTHER PUBLICATIONS

International Search Report and Written Opinion from PCT/US2014/047576, issued Jan. 13, 2015, Apple Inc., pp. 1-8.

*Primary Examiner* — Eleni Shiferaw
*Assistant Examiner* — Paul Callahan
(74) *Attorney, Agent, or Firm* — Meyertons, Hood, Kivlin, Kowert & Goetzel, P.C.; Lawrence J. Merkel

(57) ABSTRACT

In an embodiment, a peripheral interface controller may include an inline cryptographic engine which may encrypt data being sent over a peripheral interface and decrypt data received from the peripheral interface. The encryption may be transparent to the device connected to the peripheral interface that is receiving/supplying the data. In an embodiment, the peripheral interface controller is included in a system on a chip (SOC) that also includes a memory controller configured to couple to a memory. The memory may be mounted on the SOC in a chip-on-chip or package-on-package configuration. The unencrypted data may be stored in the memory for use by other parts of the SOC (e.g. processors, on-chip peripherals, etc.). The keys used for the encryption/decryption of data may remain within the SOC.

17 Claims, 6 Drawing Sheets

(56) References Cited

U.S. PATENT DOCUMENTS

| | | |
|---|---|---|
| 2010/0268953 A1 | 10/2010 | Matsukawa et al. |
| 2012/0210095 A1 | 8/2012 | Nellans et al. |
| 2012/0311239 A1 | 12/2012 | Debout et al. |
| 2014/0325235 A1* | 10/2014 | Thompson et al. .......... 713/189 |

* cited by examiner

EMBEDDED ENCRYPTION/SECURE MEMORY MANAGEMENT UNIT FOR PERIPHERAL INTERFACE CONTROLLER

BACKGROUND

1. Field of the Invention

This invention is related to the field of peripheral interface controllers and, more particularly, to encryption and secure memory management unit (MMU) functionality in peripheral interface controllers.

2. Description of the Related Art

Integrated circuits in a variety of devices include one or more peripheral interface controllers to communicate on peripheral interfaces to other components of the device. A variety of industry-standard interfaces can be used, such as Peripheral Component Interconnect (PCI), PCI Express (PCIe), Universal Serial Bus (USB), Firewire™, etc.

Because the peripheral interfaces are connected between components (e.g. on a printed circuit board (PCB)), the data transmitted on the peripheral interfaces can be somewhat more easily observed by a third party as compared to data that remains within a component. For example, the data may be protected by copyright or may be otherwise protected digital content that requires a license to view. The third party may be attempting to steal the data.

Additionally, a variety of storage devices (e.g. solid state storage such as Flash memory, magnetic storage such as fixed or removable disk drives, optical storage such as compact disk (CD) or digital video disk (DVD) storage, etc.) can be connected via a peripheral interface. Data stored in/on such storage devices may be accessible to a third party as well. Accordingly, protecting the data while stored on the storage device may also be needed for security.

SUMMARY

In an embodiment, a peripheral interface controller may include an inline cryptographic engine which may encrypt data being sent over a peripheral interface and decrypt data received from the peripheral interface. The encryption may be transparent to the device connected to the peripheral interface that is receiving/supplying the data. That is, the device may not even be "aware" that the data being received/supplied is encrypted. Accordingly, if the data being transmitted across the peripheral interface is observed, the true data may still be protected via the encryption. Additionally, performing the encryption "on the fly" as the data is passed through the peripheral interface controller may reduce the latency for producing/consuming the data.

In an embodiment, the peripheral interface controller is included in a system on a chip (SOC) that also includes a memory controller configured to couple to a memory. The memory may be mounted on the SOC in a chip-on-chip or package-on-package configuration. The unencrypted data may be stored in the memory for use by other parts of the SOC (e.g. processors, on-chip peripherals, etc.). Accordingly, the true data may be available for processing in a relatively secure environment. The keys used for the encryption/decryption of data may remain within the SOC and/or the attached memory, and thus may remain relatively secure as well.

BRIEF DESCRIPTION OF THE DRAWINGS

The following detailed description makes reference to the accompanying drawings, which are now briefly described.

Figure 1:
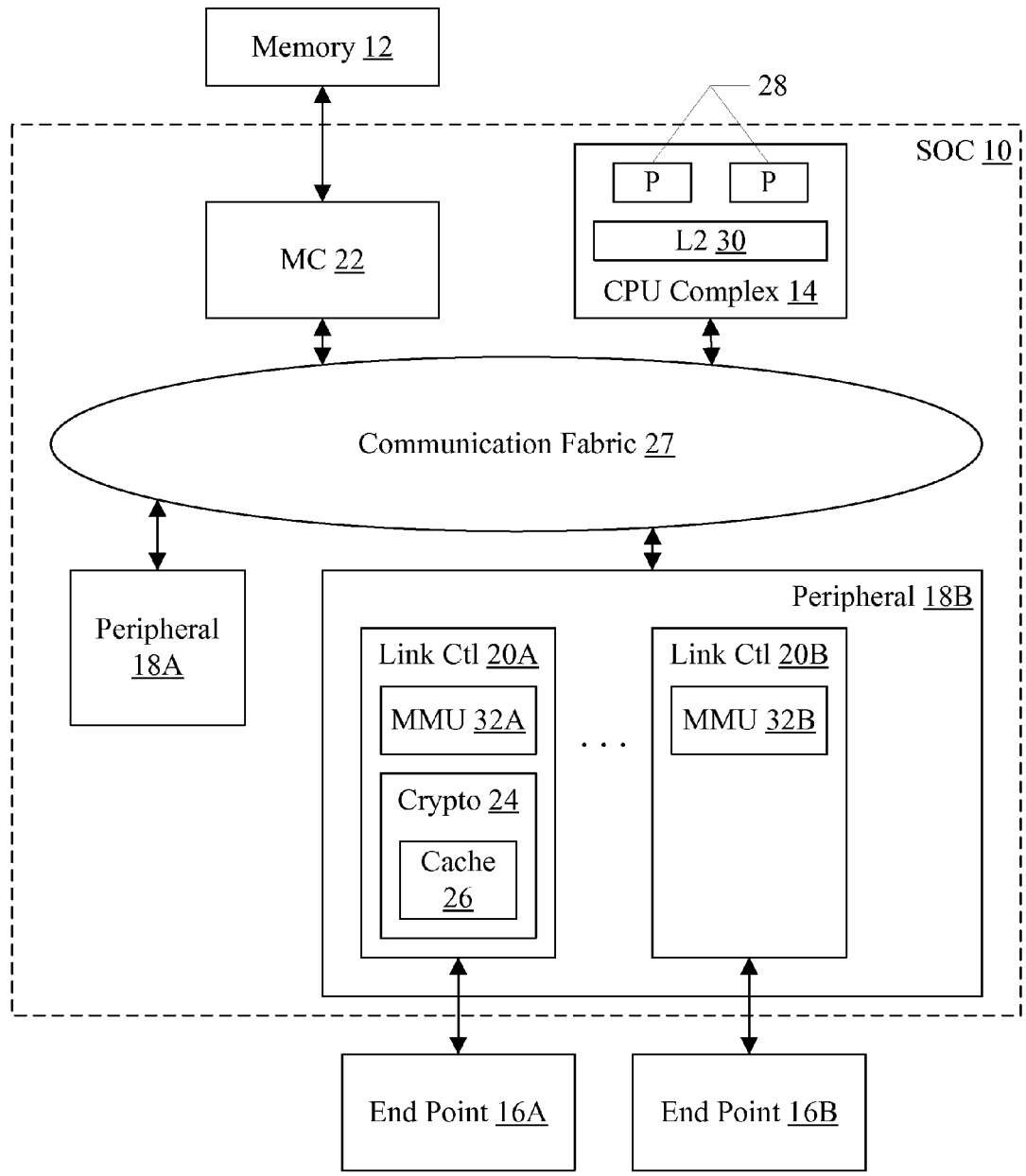
FIG. 1 is a block diagram of one embodiment of a system on a chip (SOC).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of an SOC 10 is shown coupled to a memory 12 and one or more external peripheral devices (illustrated as end points 16A-16B in FIG. 1). As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, on-chip peripheral components 18A-18B (more briefly, "peripherals"), a memory controller 22, and a communication fabric 27. The components 14, 18A-18B, and 22 may all be coupled to the communication fabric 27. The memory controller 22 may be coupled to the memory 12 during use, and the peripheral 18B may be coupled to the end points 16A-16B during use. In the illustrated embodiment, the CPU complex 14 includes one or more processors 28 and a level two (L2) cache 30.

The peripherals 18A-18B may be any set of additional hardware functionality included in the SOC 10. For example, the peripherals 18A-18B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

More particularly in FIG. 1, the peripheral interface controller 18B may include link control circuits 20A-20B. Any number of link control circuits may be included. Generally, each link control circuit 20A-20B may control a link defined according the peripheral interface implemented by the peripheral interface controller 18B. The links may be logically and physically independent of each other. That is, communication between the link control circuit 20A and the end point 16A may be independent of the link control circuit 20B and the end point 16B. In an embodiment, each link control circuit 20A-20B may be configured to operate as a root complex for the peripheral interface to which it is coupled. The root complex may be configured to process transactions transmitted by the end points 16A-16B to the memory 12 (over the communication fabric 27). The end point 16A-16B may be the logical termination of transactions (e.g. it may be the source/sink of data for the transaction).

The link control circuit 20A includes a cryptographic unit 24, which may include a cache 26. The cryptographic unit 24 may be configured to encrypt data received from the memory 12 (through the memory controller 22 and over the communication fabric 27) that is to be transmitted over the link to the end point 16A. The cryptographic unit 24 may further be configured to decrypt data received from the end point 16A over the link to be transmitted to the memory 12 (over the communication fabric 27 to the memory controller 22). Thus, in an embodiment, write transactions received on the link from the end point 16A may have write data decrypted in the cryptographic unit 24, and the decrypted data may be transmitted with the write memory operation over the communication fabric 27 to the memory controller 22. Read transactions received on the link from the end point 16A may have the return data provided from the memory 12 (over the communication fabric 27 from the memory controller 22) encrypted by the cryptographic unit 24 and the encrypted data may be transmitted in a read response over the link to the end point 16A.

The cryptographic unit 24, in addition to supporting the encryption and decryption of data, may also support address translation for the addresses of the transactions transmitted by the end point 16A. That is, the end point 16A may transmit transactions that include virtual addresses, and the cryptographic unit 24 may be configured to translate the virtual addresses to physical addresses that access memory. The cryptographic unit 24 may be provided with data structures in memory 12 to supply cryptographic control data (e.g. encryption keys, initialization vectors or data to generate the initialization vectors, etc.) as well as data to translate the virtual address to the physical address. The cryptographic unit 24 may include a cache 26 to cache some of the data structure, to reduce the latency for performing the translation and performing the encryption/decryption.

Virtual to physical address translation may also be supported by MMUs 32A-32B in the link control circuits 20A-20B. The MMUs 32A-32B may employ page table based translation, similar to the translation mechanisms employed in processors 28. In the link control circuit 20A, the MMU 32A may be used to provide address translation while the cryptographic unit 24 provides the encryption/decryption, or the cryptographic unit 24 may be used for both encryption/decryption and address translation. The MMU 32A may be used for other transactions for which data is not encrypted.

In the illustrated embodiment, the link control circuit 20A supports encryption/decryption (cryptographic operations) for transactions while the link control circuit 20B supports only address translation. By providing some links with cryptographic support and other links without cryptographic support, the security goals of the SOC 10 may be met efficiently by not including cryptographic hardware on links on which it is not required. In various embodiments, any number of link control circuits 20A-20B may be provided and any number of the provided link control circuits 20A-20B may provide cryptographic support, including embodiments in which each link control circuit 20A-20B includes cryptographic support.

The CPU complex 14 may include one or more CPU processors 28 that serve as the CPU of the SOC 10. The CPU of the system includes the processor(s) that execute the main control software of the system, such as an operating system. Generally, software executed by the CPU during use may control the other components of the system to realize the desired functionality of the system. The processors 28 may also execute other software, such as application programs. The application programs may provide user functionality, and may rely on the operating system for lower level device control. Accordingly, the processors 28 may also be referred to as application processors. The CPU complex 14 may further include other hardware such as the L2 cache 30 and/or and interface to the other components of the system (e.g. an interface to the communication fabric 27). Generally, a processor may include any circuitry and/or microcode configured to execute instructions defined in an instruction set architecture implemented by the processor. The instructions and data operated on by the processors in response to executing the instructions may generally be stored in the memory 12, although certain instructions may be defined for direct processor access to peripherals as well. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache 30 or caches in the processors 28, which serve only certain components. Additionally, in some embodiments, a system cache need not be located within the memory controller 22.

In an embodiment, the memory 12 may be packaged with the SOC 10 in a chip-on-chip or package-on-package configuration. A multichip module configuration of the SOC 10 and the memory 12 may be used as well. Such configurations may be relatively more secure (in terms of data observability) than transmissions to other components in the system (e.g. to the end points 16A-16B). Accordingly, protected data may reside in the memory 12 unencrypted, whereas the protected data may be encrypted for exchange between the SOC 10 and the end points 16A-16B.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 1, such as within the CPU complex 14 and the peripheral interface controller 18B) may vary from embodiment to embodiment. There may be more or fewer of each component/subcomponent than the number shown in FIG. 1.

Figure 2:
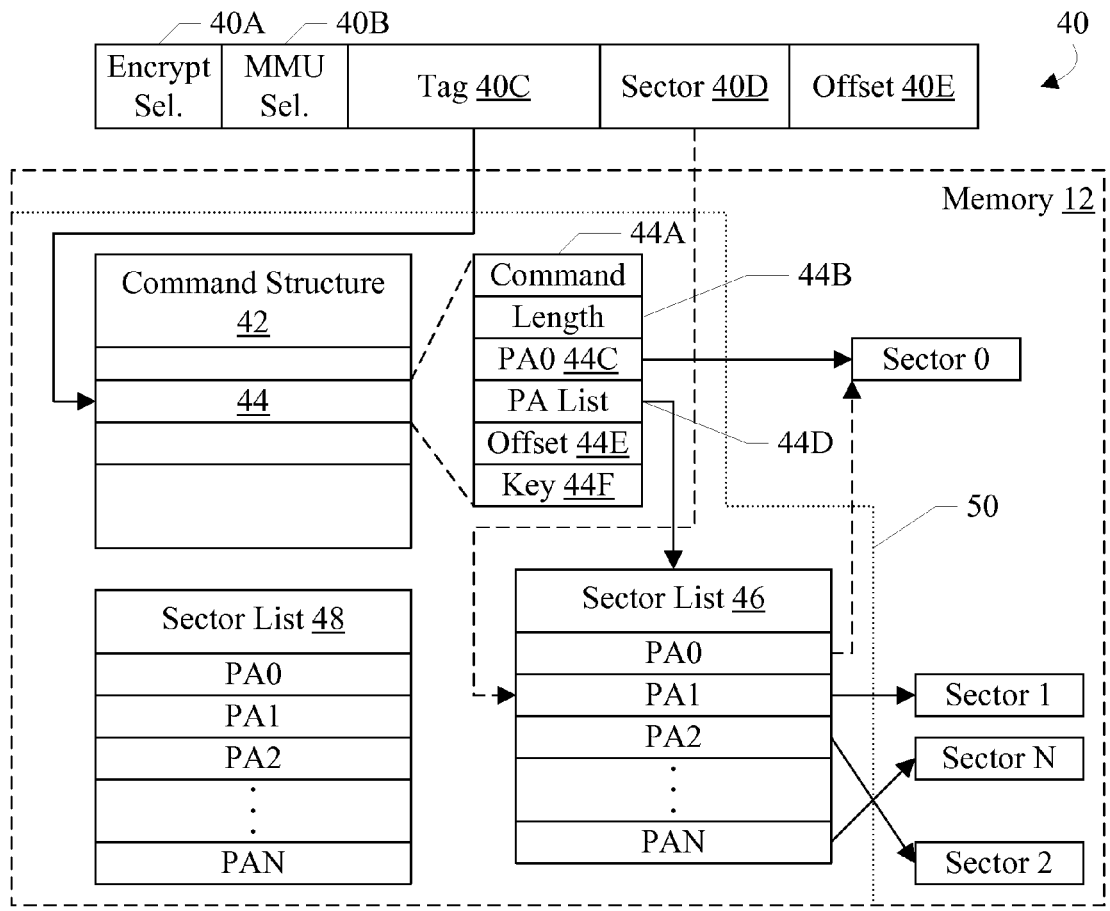
FIG. 2 is a block diagram of one embodiment of one or more data structures that may be used by one embodiment of an embedded cryptographic unit.

Turning next to FIG. 2, a block diagram illustrating one embodiment of data structures in the memory 12 that may be used by one embodiment of the cryptographic unit 24 to obtain cryptographic control data and to translate the virtual address of an end point transaction.

The virtual address is illustrated at reference numeral 40, and is divided into several fields. An encryption select field 40A indicates whether or not the transaction's data is encrypted for transmission on the link. An MMU select field 40B selects either the MMU 32A or the cryptographic unit 24 to translate the address. The remainder of the address is divided into a tag field 40C, a sector field 40D, and an offset field 40E.

The tag field 40C indexes a command structure 42 stored in the memory 12. The command structure 42 includes multiple entries such as entry 44, which is shown in exploded view in FIG. 2. The base address of the command structure 42 may be programmed into the cryptographic unit 24, and the tag field 40C may serve as an entry number beginning at the base address. That is, the tag field 40C multiplied by the size of the entry 44 and added to the base address may yield the address of the entry.

In exploded view, the entry 44 is exemplary of the contents of each entry in the command structure 42. Generally, the command structure 42 may provide cryptographic control data and may also provide a pointer to a second data structure, the sector list 46. The sector list pointer field 44D may point to the sector list 46, described in more detail below. The command field 44A may provide various control information for the operation, such as whether or not to encrypt the data, the source of the key (either the key field 44F or a key that is hardcoded into the SOC 10), key length, and read/write permissions for the operation. The length field 44B may specify the length of the data buffer (e.g. the number of sectors that are accessible via the entry 44). The PA0 field 44C may store the physical address from the initial entry in the sector list 46. That is, the PA0 field 44C may store the physical address of sector 0. PA0 is also stored in the initial entry in the sector list 46, but the PA0 field 44C may be used to more quickly provide PA0 when the entry 44 is first accessed. Since a group of transactions that access memory through the entry 44 may often start with the transaction for PA0, latency to generating the address may be reduced. Later transactions may find the entry 44 and a portion of the sector list 46 in the cache 26. The offset field 44E may store a value that may be used, in some algorithms, to generate the initialization vector (IV) for the encryption. Particularly, the offset field 44E and the sector field 40D of the address may be used to generate the IV. In an embodiment, the sector field 40D may be added to the offset field 44E, and the resulting value may be concatenated to itself (duped) to create the IV. In an embodiment, the inclusion of the offset field 44E may ensure that data in an end point storage device is not moved within the end point between being stored there and being provided to the memory 12. Finally, the key field 44F may store the encryption key for the operation, in the case that the key source is the entry 44.

The sector list 46 may be a list of physical addresses to sectors that store the data accessed by the transaction (e.g. the sink for the data if the transaction is a write, or the source of the data if the transaction is a read). Each command structure entry may have an associated sector list (e.g. a second sector list 48 is shown in FIG. 2 as well). The sector field 40D may be an index into the sector list 46, and may select a physical address for the transaction. The physical addresses in the sector list 46 need not be in numerical order. That is, physical addresses may point anywhere in the system memory 12. For example, the physical address 2 (PA2) in the sector list 46 points to a sector 2 that is below sector N, pointed to by the physical address N (PAN) in the sector list 46. Accordingly, sectors may be scattered in the memory 12 in any fashion.

The command structure 42 and the sector lists 46 and 48 may be in a protected section of memory (illustrated by dotted line 50). There may not be translations in either the MMUs 32A-32B nor physical addresses in the sector lists 46 and 48 that point to data in the protected section. Accordingly, the section may be inaccessible to the end points 16A-16B.

Figure 3:
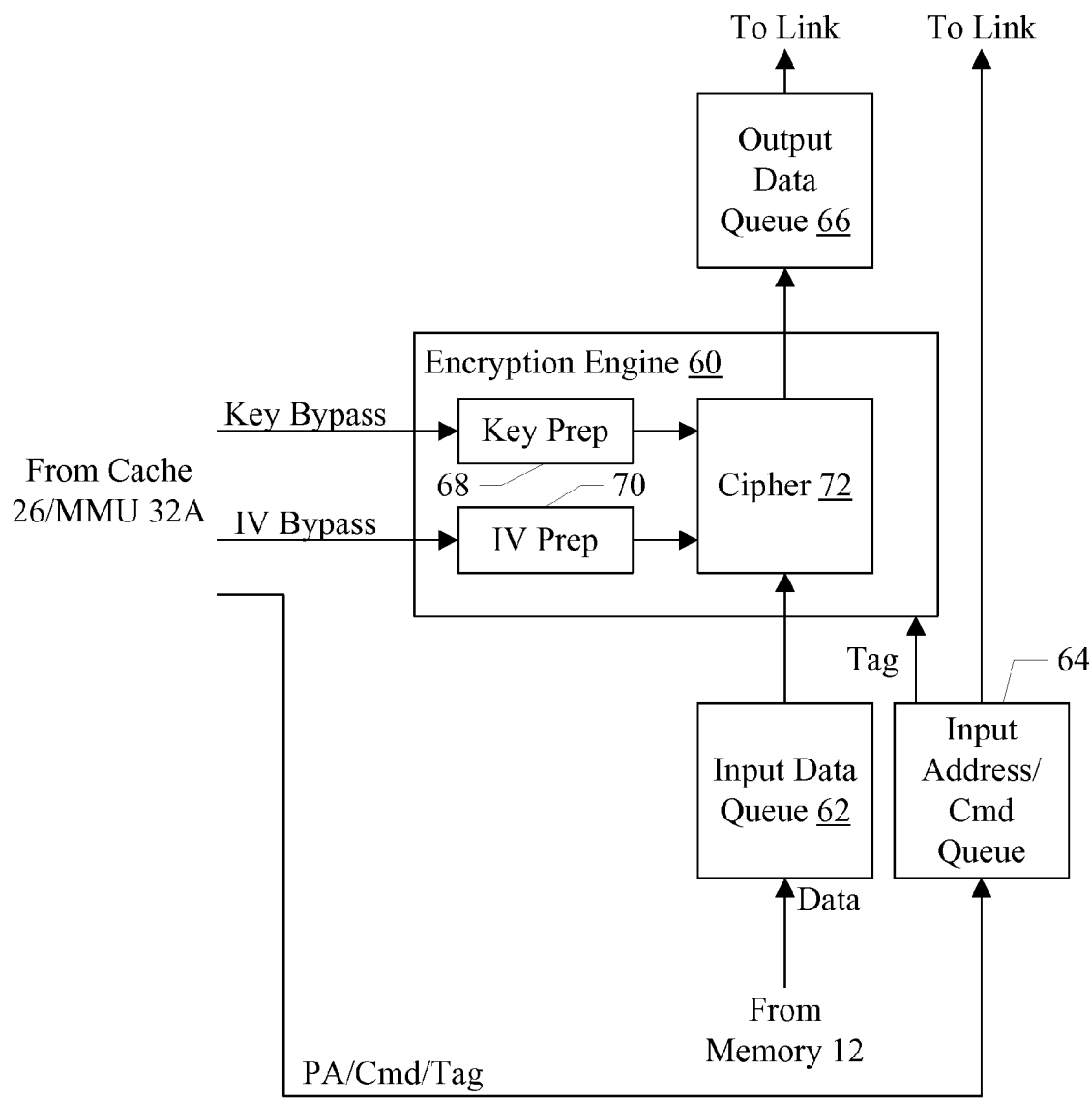
FIG. 3 is a block diagram of one embodiment of a portion of the embedded cryptographic unit.

Turning now to FIG. 3, a block diagram of a portion of the cryptographic unit 24 is shown. The portion shown in FIG. 3 may be the encryption path on the outbound data to be transmitted on the link. In the illustrated embodiment, the portion includes an encryption engine 60, an input data queue 62, an input address/command queue 64, and an output data queue 66. The input data queue 62 and the input address/command queue 64 are coupled to the encryption engine 60, which is coupled to the output data queue 66. The encryption engine 60 is further coupled to receive Key and IV bypass inputs from the cache 26/MMU 32A. In the illustrated embodiment, the encryption engine 60 includes a key preparation circuit 68, an IV preparation circuit 70, and a cipher circuit 72. The key preparation circuit 68 and the IV preparation circuit 70 are coupled to receive the key bypass and IV bypass inputs, respectively, and are coupled to the cipher circuit 72. The cipher circuit 72 is coupled to the input data queue 62 and the output data queue 66.

The input data queue 62 may be coupled to receive data provided in response to a previous read request received on the link. The corresponding physical address and command (a read response, in this case) may be provided from the cache 26 and/or the MMU 32A. In some embodiments, the encryption engine 60 may support more than one encryption context (combination of key and IV, and potentially state for the encryption itself depending on the implemented encryption algorithm). A tag may be provided by the cache/MMU as well to indicate which encryption context is used for the data. In an embodiment, there may be two contexts, an active context and a background context. The tag may indicate whether the active context or background context is to be used, and the encryption engine 60 may swap contexts based on the tag.

As mentioned above, the key and IV values may be bypassed to the encryption engine 60, possibly prior to the transmission of the physical address and other information. Since the data is queued in the input data queue 62, possibly behind other data belonging to a different encryption context, the bypass may also be prior to the key and IV being needed to encrypt the data. The key preparation circuit 68 and the IV preparation circuit 70 may be configured to prepare the key and IV, respectively, for use in the cipher circuit 72. If another encryption context is active in the cipher circuit 72, the preparation may be performed "in the background," not interrupting the ongoing encryption. The cipher circuit 72 may implement the encryption, based on the prepared IV and key values. The cipher circuit 72 may be configured to encrypt the data from the input data queue 62 and may write the encrypted data to the output data queue 66. The corresponding input address and command may be provided from the input address/command queue 64, and may be forwarded with the encrypted data to the circuitry that prepares packets for transmission on the link.

Figure 4:
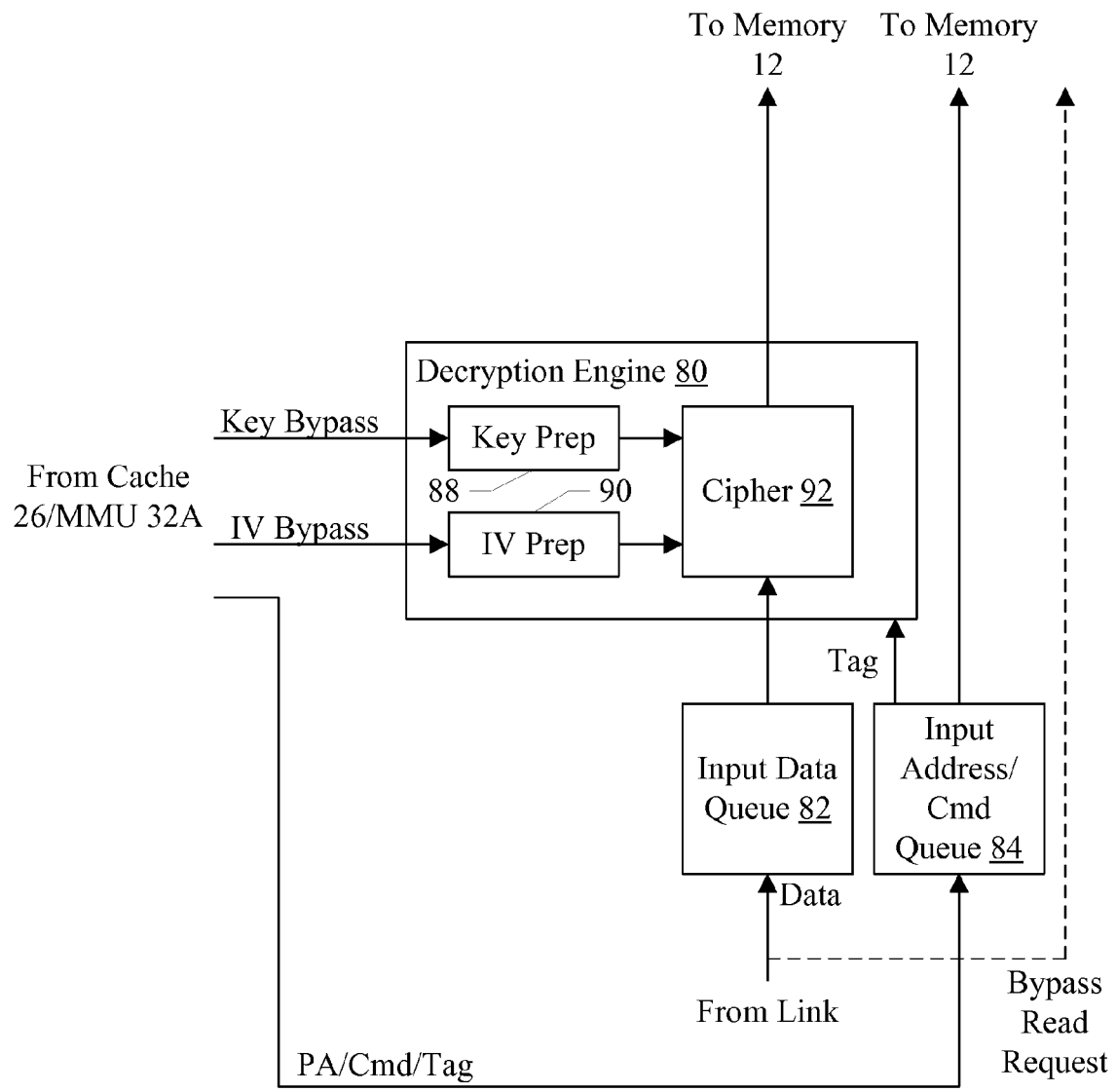
FIG. 4 is a block diagram of one embodiment of another portion of the embedded cryptographic unit.

FIG. 4 is a block diagram of a portion of the cryptographic unit 24 is shown. The portion shown in FIG. 4 may be the decryption path on the inbound data received from the link. In the illustrated embodiment, the portion includes a decryption engine 80, an input data queue 82, and an input address/command queue 84. No output data queue may be required in this case to queue decrypted data for transmission to the memory 12 (over the fabric interface 27, to the memory controller 22). An output buffer may be provided for timing purposes, or in some embodiments an output data queue may be included. The input data queue 82 and the input address/command queue 84 are coupled to the decryption engine 80, which is coupled to provide decrypted data to the memory. The decryption engine 80 is further coupled to receive Key and IV bypass inputs from the cache 26/MMU 32A. In the illustrated embodiment, the decryption engine 80 includes a key preparation circuit 88, an IV preparation circuit 90, and a cipher circuit 92. The key preparation circuit 88 and the IV preparation circuit 90 are coupled to receive the key bypass and IV bypass inputs, respectively, and are coupled to the cipher circuit 92. The cipher circuit 92 is coupled to the input data queue 82.

The input data queue 82 may be coupled to receive data provided from the link. The data may be write data, which may be encrypted, or may be data from a read request packet. The input address/command queue 84 may receive the command, physical address, and tag from the cache 26/MMU 32A, similar to the input address/command queue 64 described above. The read requests may be bypassed around the decryption engine 80, in some embodiments, although order between requests may be maintained.

Similar to the discussion above with regard to the encryption engine 60, the key and IV values may be bypassed to the decryption engine 80. The key preparation circuit 88 and the IV preparation circuit 90 may be configured to prepare the key and IV, respectively, for use in the cipher circuit 92. If another decryption context is active in the cipher circuit 92, the preparation may be performed "in the background," not interrupting the ongoing decryption. The cipher circuit 92 may implement the decryption, based on the prepared IV and key values. The cipher circuit 92 may be configured to decrypt the data from the input data queue 82 and may provide the decrypted data for transmission to the memory 12 with the write memory operation corresponding to the write command. The corresponding input address and command for the write memory operation may be provided from the input address/command queue 84.

Figure 5:
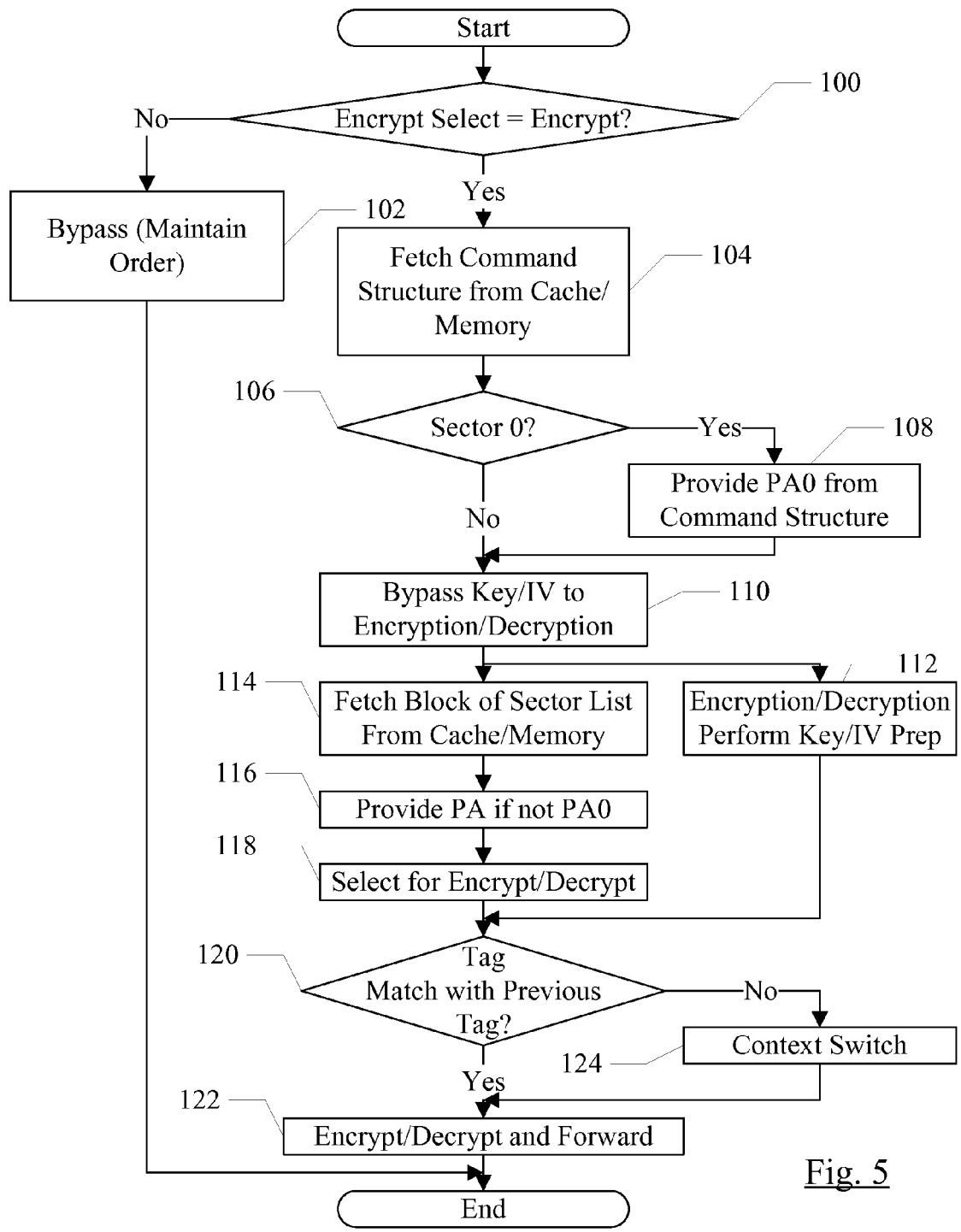
FIG. 5 is a flowchart illustrating operation of one embodiment of the embedded cryptographic unit.

Turning now to FIG. 5, a flowchart illustrating aspects of one embodiment of operation of the cryptographic unit 24 is shown. While the blocks are shown in a particular order for ease of understanding, other orders may be used. Blocks may be performed in parallel in combinatorial logic in the cryptographic unit 24. Blocks, combinations of blocks, and/or the flowchart as a whole may be pipelined over multiple clock cycles. The cryptographic unit 24 may be configured to implement the operation shown in FIG. 5.

If the encryption select for the transaction does not indicate encryption (decision block 100, "no" leg), the transaction may bypass the cryptographic unit 24 (block 102). The order of transactions from the end point may be maintained, however. The encryption select, in an embodiment, may include both the encryption select field 40A from the address and the encryption control field in the command field 44A of the selected entry 44. That is, both the encryption select field 40A may indicate encryption and the encryption control field in the command field 44A may indicate encryption to result in selecting encryption for the transaction.

If the encryption select does indicate encryption (decision block 100, "yes") leg, the cryptographic unit 24 may fetch the command structure entry for the transaction from the cache 26 or from the memory 12, in the case of a cache miss (block 104). If the command structure entry is a cache miss, the command structure entry may be cached when retrieved from memory. If the transaction is to sector 0 of the command structure entry, and the translation is performed by the cryptographic unit 24 as opposed to the MMU 32A (indicated by the MMU select field 40B) (decision block 106, "yes" leg), the cryptographic unit may provide the physical address for sector 0 from the field 44C of the command structure entry (block 108). The cryptographic unit 24 may also bypass the key from the field 44F (or other location, depending on the key source) and the IV to the encryption or decryption engine (block 110), which may begin background preparation of the key/IV (block 112) in parallel with further processing of the encryption control data structures.

Based on the sector for the transaction, the cryptographic unit 24 may fetch a block of the sector list 46/48 pointed to by the PA list field 44D from the cache 26 or the memory 12 (block 114). The fetched block may be the block that includes the physical address corresponding to the sector field 40D. If the block is a miss in the cache 26, the block may be cached in the cache 26 upon return from memory. In an embodiment, the cache 26 may be configured to cache multiple blocks of the sector list for a given command structure entry 44. In such embodiments, the cache 26 may prefetch the next consecutive blocks of the sector list as well.

When the block of the sector list is returned, the cryptographic unit 24 may provide the physical address of the sector (except in the case of sector 0, because the physical address was bypassed from the command structure entry 44) (block 116). The encryption engine 60 or decryption engine 80 may select the transaction for encryption/decryption when it reaches the head of the input queue (block 118). If the tag of the transaction matches the previous tag from the most recent encryption/decryption (decision block 120, "yes" leg), the current encryption/decryption context may be used and the data may be encrypted/decrypted and forwarded (block 122). If the tag does not match (decision block 120, "no" leg), the encryption engine 60/decryption engine 80 may switch to the correct encryption/decryption context (block 124) and the data may be encrypted/decrypted and forwarded (block 122).

Figure 6:
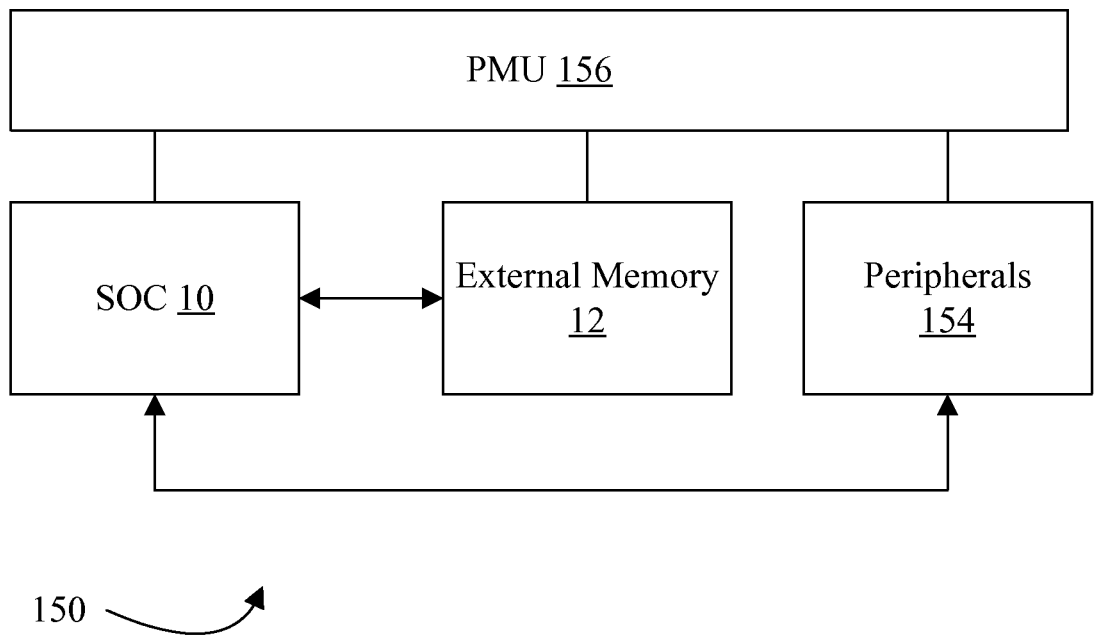
FIG. 6 is a block diagram of one embodiment of a system.

FIG. 6 a block diagram of one embodiment of a system 150. In the illustrated embodiment, the system 150 includes at least one instance of the SOC 10 coupled to one or more external peripherals 154 (including the end points 16A-16B and/or additional external peripherals) and the external memory 12. A power management unit (PMU) 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
   a memory controller comprising circuitry configured to couple to a memory;
   a fabric interface comprising circuitry coupled to the memory controller circuit; and
   a peripheral interface controller comprising circuitry coupled to the fabric interface and configured to couple to an external peripheral interface to communicate with one or more devices external to the integrated circuit, wherein the peripheral interface controller circuit comprises a cryptographic unit comprising circuitry configured to encrypt data received from the memory over the fabric interface, and wherein the peripheral interface controller is configured to transmit the encrypted data on the external peripheral interface, and wherein the cryptographic unit is configured to decrypt data received by the peripheral interface controller from the external peripheral interface, and wherein the peripheral interface controller is to transmit the decrypted data to the memory over the fabric interface, and wherein the cryptographic unit is further configured to translate virtual addresses used in transactions generated by the one or more devices on the peripheral interface to physical addresses used to address the memory, and wherein the cryptographic unit is configured to read a first entry from a first data structure in memory in response to a first transaction from the interface, and wherein the first data structure further includes a first physical address of a plurality of physical addresses that correspond to the first entry, and wherein remaining physical addresses that correspond to the first entry are stored in a second data structure in memory, and wherein the cryptographic unit is configured to associate the first physical address with the first transaction responsive to the first transaction selecting the first physical address from the plurality of physical addresses prior to reading the second data structure.

2. The integrated circuit as recited in claim 1 wherein the peripheral interface controller further comprises a memory management unit (MMU) configured to translate the virtual addresses to physical addresses that access the memory, and wherein a given transaction is coded to use a translation from one of the cryptographic unit and the MMU.

3. The integrated circuit as recited in claim 1 wherein the first data structure includes an encryption key for encrypting/decrypting data accessed by the first transaction.

4. The integrated circuit as recited in claim 3 wherein the cryptographic unit is configured to initiate preparation of the key for encryption prior to obtaining the first physical address to be accessed by the first transaction.

5. The integrated circuit as recited in claim 1 wherein the cryptographic unit comprises a cache, and wherein the cache is configured to cache the first entry and a portion of the second data structure.

6. The integrated circuit as recited in claim 1 wherein the peripheral interface controller is configured to couple to a second instance of the peripheral interface, and wherein the peripheral interface controller does not support encryption on the second instance.

7. A method comprising:
   receiving a first write transaction from a peripheral interface in a peripheral interface controller, the first write transaction defined to update a first memory location in a memory system to which the peripheral interface controller is coupled separate from the peripheral interface;
   determining, in the peripheral interface controller, that the first write transaction specifies encryption protection for first data corresponding to the first write transaction responsive to a first indication in a first address of the first write transaction;

decrypting the first data to generate first decrypted data responsive to determining that the first write transaction specifies encryption protection;

writing the first decrypted data to the memory;

translating the first address in the first write transaction to a first physical address, wherein the translating includes reading a first entry of a first data structure stored in memory responsive to a first portion of the address; and reading a second data structure indicated by the first entry, wherein the second data structure includes a list of physical addresses that are selected based on a second portion of the address.

8. The method as recited in claim 7 further comprising:

receiving a first read transaction from the peripheral interface in the peripheral interface controller, the first read transaction defined to read a second memory location in the memory system;

determining, in the peripheral interface controller, that the first read transaction specifies encryption protection for second data corresponding to the first read transaction;

encrypting the second data to generate first encrypted data responsive to determining that the first read transaction specifies encryption protection; and transmitting the first encrypted data on the peripheral interface.

9. The method as recited in claim 8 wherein determining that the first read transaction specifies encryption protection is responsive to a second indication in a second address of the first read transaction.

10. The method as recited in claim 7 wherein the first entry includes an encryption key, and wherein the method further comprises:

bypassing the encryption key to a decryption engine; and preprocessing the encryption key in the decryption engine prior to receiving the first physical address in the decryption engine.

11. The method as recited in claim 10 wherein the first entry includes an initial physical address from the list of physical addresses, and wherein the method further comprises bypassing the initial physical address from the first entry for use by the decryption engine responsive to the initial physical address being selected as the first physical address.

12. The method as recited in claim 11 further comprising caching the first entry and a first portion of the list in the peripheral interface unit.

13. An integrated circuit comprising:

a memory controller comprising circuitry configured to couple to a memory;

a fabric interface comprising circuitry coupled to the memory controller; and a peripheral interface controller comprising circuitry coupled to the fabric interface and configured to couple to a plurality of links of an external peripheral interface, wherein each of the links is coupled to an end point during use, and wherein the peripheral interface controller includes a cryptographic unit comprising circuitry configured to encrypt data to transmit on a first link of the plurality of links and to decrypt data received from the first link, and wherein the peripheral interface controller supports only unencrypted data transfer on a second link of the plurality of links.

14. The integrated circuit as recited in claim 13 wherein the peripheral interface unit further comprises a first memory management unit (MMU) for the first link and a second MMU for the second link to translation virtual addresses from the plurality of links to physical addresses for accessing memory.

15. The integrated circuit as recited in claim 14 wherein the cryptographic unit is configured to translate addresses for the first link, and wherein a given transaction on the first link is translatable using either the first MMU or the cryptographic unit.

16. The integrated circuit as recited in claim 15 wherein the cryptographic unit is configured to access a plurality of data structures in the memory to obtain cryptographic control data and address translation data.

17. The integrated circuit as recited in claim 16 wherein the cryptographic unit is configured to preprocess cryptographic control data prior to obtaining a corresponding translation.

* * * * *